UNITED STATES PATENT OFFICE.

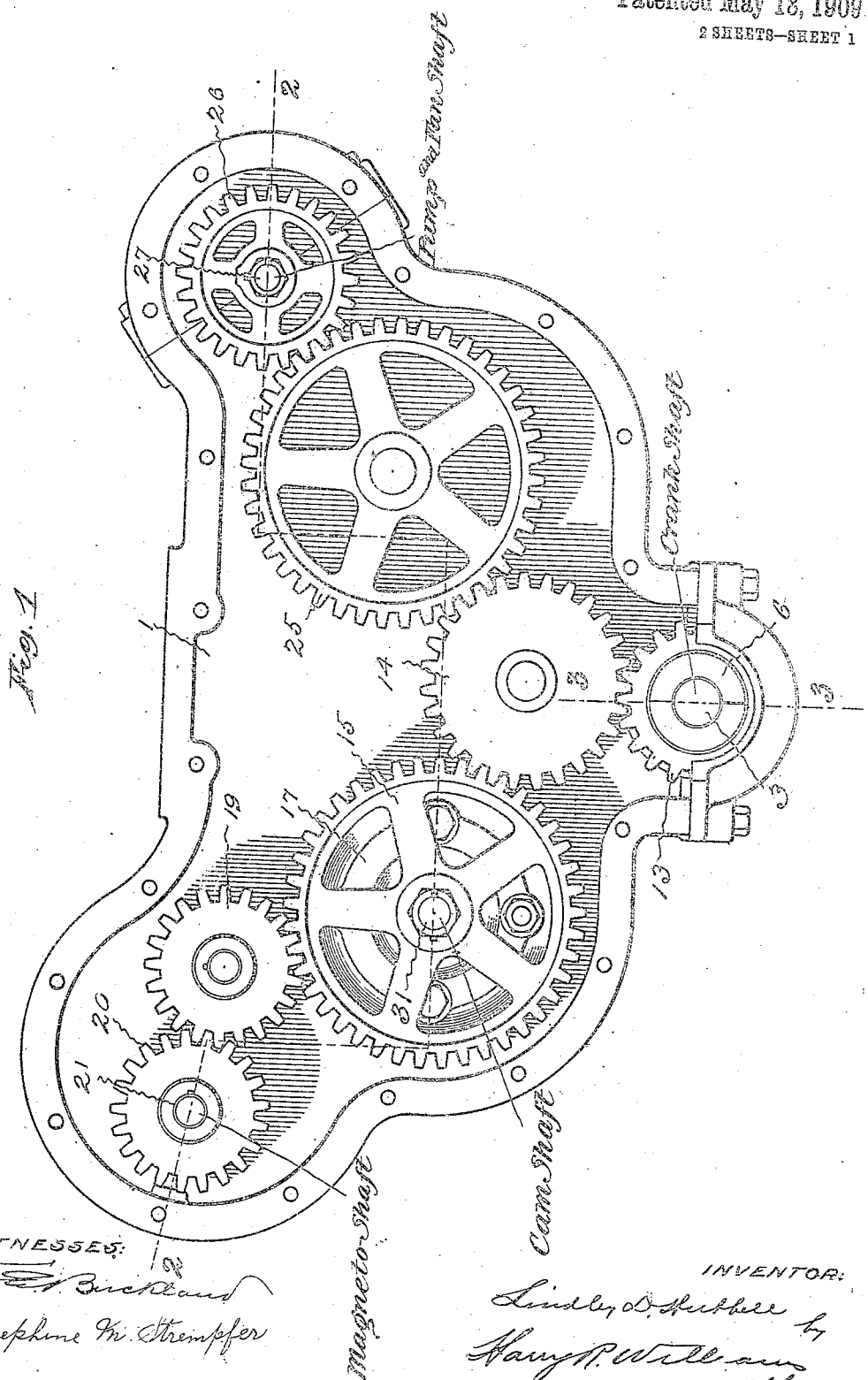

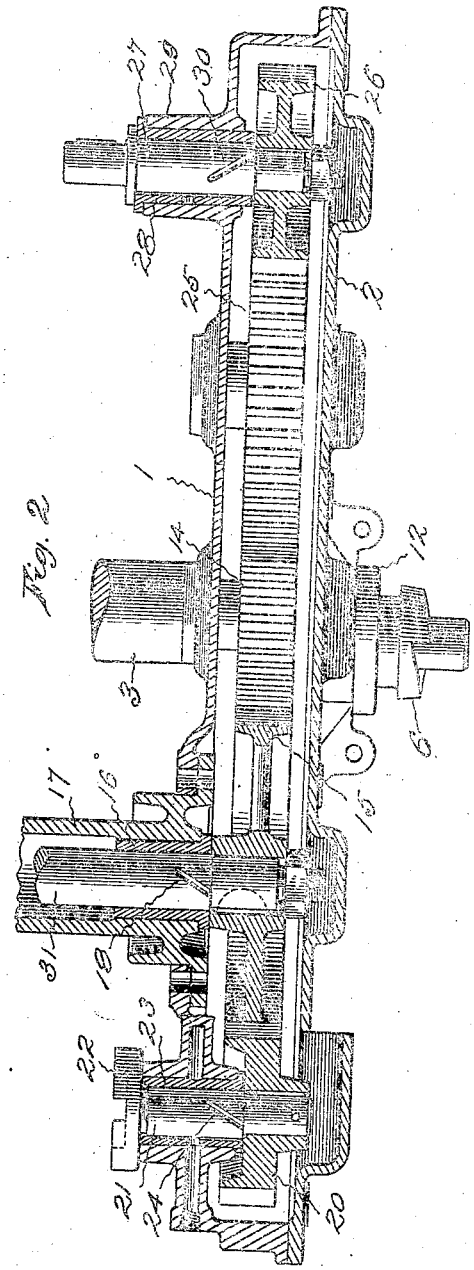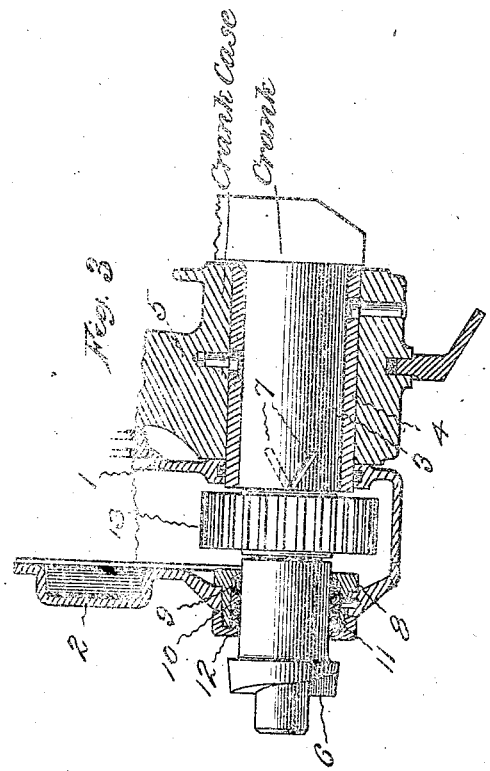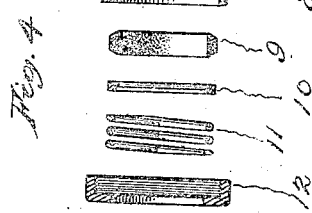

LINDLEY D. HUBBELL, OF HARTFORD, CONNECTICUT, ASSIGNOR TO THE POPE MANUFACTURING COMPANY, OF HARTFORD, CONNECTICUT, A CORPORATION OF CONNECTICUT.

TIMING GEAR MECHANISM FOR EXPLOSIVE-ENGINES.

No. 921,705.   Specification of Letters Patent.   Patented May 18, 1909.

Application filed April 27, 1908. Serial No. 429,524.

*To all whom it may concern:*

Be it known that I, LINDLEY D. HUBBELL, a citizen of the United States, residing at Hartford, in the county of Hartford and State of Connecticut, have invented a new and useful Timing Gear Mechanism for Explosive-Engines, of which the following is a specification.

This invention relates more particularly to the mechanism which is provided for driving the inlet and exhaust valve cam shaft, the magneto shaft and the pump and fan driving shaft, of an explosive engine of the four-cycle gasolene type designed for propelling automobiles, although it is applicable to other types of engines. In engines of the type mentioned there is usually at the end of the crank shaft case, a case containing a pinion mounted on the crank shaft, a gear mounted on the end of the inlet and exhaust valve cam shaft, a pinion mounted on the end of the magneto shaft and a pinion mounted on the end of the pump and fan driving shaft, with intermediate gears and pinions so arranged that the several gears and pinions are driven by the rotation of the pinion on the crank shaft. These pinions and gears are driven very rapidly; often the crank shaft pinion is rotated at the rate of 2,000 revolutions per minute. As a matter of necessity in order to reduce friction and wear and eliminate noise and rattle, the case containing these timing pinions and gears is packed with a thick grease or heavy non-liquid lubricant. The adjoining crank case containing the crank shaft, the end of which extends through the timing gear case, contains a liquid lubricant for lubricating and keeping cool the crank and piston rod connections. As a result of the high speed of the gears and pinions in the timing gear case, the thick grease is churned into a liquid state and is subjected to such pressure that in the prior machines it would work along the crank shaft into the crank case and mingle with and thicken and impair the efficiency of the liquid lubricant therein, and it would also work out around the end of the crank shaft and also around the inlet and exhaust valve cam shaft, the magneto shaft and the pump and fan driving shaft, and even around the screws which are used to fasten the cover to the timing gear case, to such an extent that it would not only soil the crank case, the timing gear case, and the adjacent parts of the machine, but would also cause such loss that in order to keep the timing gears properly lubricated to prevent wear and eliminate noise, the timing gear case would have to be refilled with grease after the machine had been run a comparatively few miles.

The object of this invention is to provide a very simple construction whereby the thick grease which is churned up by the rapidly driven timing gears is prevented from working back into the crank case and escaping around the several shafts so that the machine may be run a great many miles without necessitating the refilling of the timing gear case with grease.

Figure 1 of the accompanying drawings is a front view of the timing gear case with the cover removed, and showing the crank shaft driving pinion, the inlet and exhaust valve cam shaft gear, the magneto driving shaft pinion, the pump and fan driving shaft pinion and the several intermediate gears and pinions. Fig. 2 is a horizontal section of the timing gear case and its contents taken on the dotted line 2—2 on Fig. 1. Fig. 3 is a vertical section through the timing gear case adjacent to the crank shaft, on the dotted line 3—3 on Fig. 1. Fig. 4 shows details of the means arranged in the timing gear case at the end of the crank shaft for preventing the escape of grease through the cover of the case at the end of the crank shaft.

The timing gear case 1 which may be in one or more pieces, and its cover 2, which is screwed or bolted thereto, are made of some thin light material, preferably aluminum, and are fastened to the front end of the engine case in any suitable manner.

The crank shaft 3 is shown as extending through a bushing 4 inserted into an opening in the end of the crank case 5 and an opening in the gear case. The front end of the crank shaft extends through an opening in the cover of the gear case and outside of the case bears the usual ratchet 6 for the engagement of the engine starting crank. The crank shaft in the section lying within the front end of the bearing bushing is provided with two or more short grooves 7 that are inclined with relation to the axis of the shaft in such manner that when the crank shaft rotates, these grooves collect any grease that attempts to escape through the bushing around the crank shaft, and forces it back into the gear case. About the crank shaft where it extends through the cover of the gear case is a gland 8 containing a packing 9 and a washer 10. The inner faces of the gland and washer are so shaped that they tend to compress the packing against the surface of the crank shaft. In the gland in front of the washer is a spring 11 and screwed upon the end of the gland about the crank shaft outside of the cover of the case so as to compress the spring against the washer and hold the gland tightly in place is a cap 12. This construction prevents the escape of grease from the gear case through the cover about the end of the crank shaft.

On the crank shaft in the gear case is a pinion 13. This pinion meshes with an intermediate gear 14 mounted on a stud, which meshes with a gear 15 that is mounted on the end of the shaft 31 which bears the cams that operate the inlet and exhaust valves of the engine. This cam shaft does not project through the cover of the gear case, but is supported by a bearing bushing 16 which is held by a sleeve 17 that is secured to the back of the gear case by any suitable means. This cam shaft in the section which is supported by the bushing is provided with one or more inclined grooves 18 so arranged that when the shaft rotates the groove collects any grease which attempts to work through the bushing around the shaft and forces it back into the gear case.

The gear on the end of the inlet and exhaust valve cam shaft meshes with an intermediate pinion 19 which meshes with a pinion 20 on the end of the shaft 21 which is provided with a clutch 22 that is adapted to engage and rotate the shaft of the magneto which produces the current for the fuel explosion sparks. The magneto shaft is supported by a bushing 23 in the back of the gear case and in the section of the shaft that is thus supported is an inclined groove 24 which collects the grease which attempts to escape through the bushing around this shaft and forces it back into the gear case when the shaft is rotated, and thus prevents the escape of grease around the magneto shaft. The intermediate gear 14 which is driven by the crank shaft pinion also meshes with an intermediate gear 25 which meshes with a pinion 26 on the end of the shaft 27 which is used to drive the water pump and fan. This shaft does not extend through the cover of the gear case but is supported by a bushing 28 arranged in the hub 29 that projects from the back of the gear case, and is provided with a groove 30 that is inclined to its axis in such manner as to collect grease which attempts to escape through the bushing around the shaft and return it to the gear case when the pinion rotates the shaft. As this shaft rotates in a direction opposite to the direction of rotation of the crank shaft, valve cam shaft and magneto shaft, the groove is made in the reverse direction.

By means of this construction when the gears and pinions are rotating at high speed, and the thick grease is churned up and subjected to considerable pressure, the grease cannot escape from the case around the several shafts to the crank case and to the atmosphere, for it is collected and forced back into the gear case by the several inclined grooves on the shafts. The only opening in the cover, which is fastened very tightly against the body of the gear case, is that through which the starting end of the crank shaft projects, and grease cannot escape through this opening on account of the packing device arranged in the case on the crank shaft at this place. As a result of this very simple construction the lubricant in the crank case cannot become thickened by grease from the gear case, nor can the grease from the gear case escape so as to soil the adjacent parts of the machine and necessitate a refilling of the gear case at short intervals.

The invention claimed is:

1. In a timing mechanism for an explosive engine in combination, a gear case, a crank shaft extending through the gear case, said crank shaft having in a section of its bearing periphery an inclined groove that opens into the gear case, a valve cam shaft extending into the gear case, said cam shaft having in its bearing periphery an inclined groove that opens into the gear case, a magneto shaft extending into the gear case, said magneto shaft having in its bearing periphery an inclined groove that opens into the gear case, a pump shaft extending into the gear case, said pump shaft having in its bearing periphery an inclined groove that opens into the gear case, and gears and pinions mounted on said shafts and so intermeshing that the several shafts are driven from the crank shaft substantially as specified.

2. In a timing mechanism for an explosive engine in combination, a crank case, a tightly closed timing gear case secured to the end of the crank case, a crank shaft extending from the crank case through the gear case, said crank shaft having about its periphery and in the gear case a gland and a packing within the gland, and means on the outside of the gear case for securing the gland in place, a valve cam shaft extending into the gear case, a magneto shaft extending into the gear case, a pump driving shaft extending into the gear case and gears and pinions mounted on said shafts and so intermeshing that the several shafts are driven from the crank shaft, substantially as specified.

3. In a timing mechanism for an explosive engine in combination, a gear case, a crank shaft extending through the gear case, said crank shaft having in its bearing periphery an inclined groove that opens into the gear case, and also having within the gear case a gland containing a packing, and means for retaining the packing in the gland, a valve cam shaft extending into the gear case, said cam shaft having in its bearing periphery an inclined groove that opens into the gear case, a magneto shaft extending into the gear case, said magneto shaft having in its bearing periphery an inclined groove that opens into the gear case, a pump shaft extending into the gear case, said pump shaft having in its bearing periphery an inclined groove that opens into the gear case, and gears and pinions mounted on said shafts and so intermeshing that the several shafts are driven from the crank shaft, substantially as specified.

4. In a timing mechanism for an explosive engine in combination, a crank case, a tightly closed timing gear case secured to the end of the crank case, a crank shaft extending from the crank case through the gear case, a pinion on said shaft in the gear case, said crank shaft having in its periphery in a bearing at one side of the pinion an inclined groove that opens into the gear case only, and having on its periphery in the gear case at the other side of the pinion a gland, with a packing in said gland, and means outside of the gear case for compressing the packing in said gland, substantially as specified.

LINDLEY D. HUBBELL.

Witnesses:
W. J. FULLER,
GEO. F. WEEKS.